(12) United States Patent
Vive et al.

(10) Patent No.: US 12,467,378 B2
(45) Date of Patent: Nov. 11, 2025

(54) FREE TURBINE TURBOGENERATOR COMPRISING A REVERSIBLE ELECTRICAL MACHINE COUPLED TO THE FREE TURBINE

(71) Applicant: SAFRAN HELICOPTER ENGINES, Bordes (FR)

(72) Inventors: Loïs Pierre Denis Vive, Moissy-Cramayel (FR); Thomas Drouin, Moissy-Cramayel (FR); Olivier Bedrine, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/251,031

(22) PCT Filed: Oct. 25, 2021

(86) PCT No.: PCT/FR2021/051875
§ 371 (c)(1),
(2) Date: Apr. 28, 2023

(87) PCT Pub. No.: WO2022/090661
PCT Pub. Date: May 5, 2022

(65) Prior Publication Data
US 2023/0323787 A1    Oct. 12, 2023

(30) Foreign Application Priority Data

Oct. 29, 2020    (FR) ........................................ 2011079

(51) Int. Cl.
*F02C 7/36* (2006.01)
*B64D 41/00* (2006.01)
(Continued)

(52) U.S. Cl.
CPC ............. *F01D 15/10* (2013.01); *B64D 41/00* (2013.01); *F02C 3/10* (2013.01); *F02C 7/36* (2013.01);
(Continued)

(58) Field of Classification Search
CPC ...................................................... F02C 3/10
See application file for complete search history.

(56) References Cited

U.S. PATENT DOCUMENTS

| | | | | |
|---|---|---|---|---|
| 3,660,976 A | * | 5/1972 | Canale | ...................... F02C 7/36 477/30 |
| 4,044,552 A | * | 8/1977 | West | ......................... F02C 7/36 60/39.24 |

(Continued)

FOREIGN PATENT DOCUMENTS

| | | |
|---|---|---|
| CN | 101981276 A | 2/2011 |
| CN | 106460660 A | 2/2017 |

(Continued)

OTHER PUBLICATIONS

French Search Report issued in French Application No. 2011079 mailed on Jun. 30, 2021.

(Continued)

*Primary Examiner* — Gerald L Sung
*Assistant Examiner* — Jacek Lisowski
(74) *Attorney, Agent, or Firm* — Bookoff McAndrews, PLLC

(57) ABSTRACT

Disclosed is a turbogenerator, in particular for an electrically-driven rotary wing aircraft, comprising a gas generator equipped with a first shaft, at least one reversible electrical machine, and a free turbine provided with a second shaft and caused to rotate by a gas flow generated by the gas generator. The second shaft is coupled to the at least one electrical machine during all phases of operation of the turbomachine, (Continued)

and the turbomachine further comprises a single mechanical coupling means for coupling the first mechanical shaft to the second mechanical shaft when the electrical machine is operating in motor mode and mechanically uncoupling the first mechanical shaft from the second mechanical shaft when the electrical machine is operating in generator mode.

20 Claims, 3 Drawing Sheets

(51) Int. Cl.
F01D 15/10 (2006.01)
F02C 3/10 (2006.01)
(52) U.S. Cl.
CPC .... F05D 2220/323 (2013.01); F05D 2220/76 (2013.01)

(56) References Cited

U.S. PATENT DOCUMENTS

| | | | | |
|---|---|---|---|---|
| 7,513,120 | B2* | 4/2009 | Kupratis | F02C 3/113 60/788 |
| 8,414,250 | B2* | 4/2013 | Hansen | F04D 25/02 415/60 |
| 10,378,452 | B1* | 8/2019 | Barmichev | F01D 7/00 |
| 10,415,482 | B2* | 9/2019 | Marconi | F02C 3/10 |
| 2011/0049891 | A1* | 3/2011 | Bedrine | F01D 15/10 290/46 |
| 2012/0249029 | A1* | 10/2012 | Cullen | H02P 29/032 318/400.21 |
| 2016/0097328 | A1 | 4/2016 | Wintgens et al. | |
| 2017/0016398 | A1* | 1/2017 | Thiriet | F02C 7/275 |
| 2017/0074169 | A1* | 3/2017 | Waissi | F02C 7/275 |
| 2018/0135522 | A1* | 5/2018 | Mitrovic | F02C 3/04 |
| 2019/0002113 | A1* | 1/2019 | Gansler | F01D 15/10 |

FOREIGN PATENT DOCUMENTS

| | | |
|---|---|---|
| CN | 106460661 A | 2/2017 |
| FR | 2 F | 9/1961 |
| FR | 2929324 A1 | 10/2009 |
| FR | 3019220 A1 | 10/2015 |
| FR | 3019222 A1 | 10/2015 |
| FR | 3019920 A1 | 10/2015 |
| FR | 3081150 A1 | 11/2019 |
| WO | 2015145036 A1 | 10/2015 |

OTHER PUBLICATIONS

International Search Report and Written Opinion issued in International Application No. PCT/FR2021/051875 mailed on Feb. 18, 2022.
First Search issued in corresponding Chinese Application No. 2021800732154, issued Dec. 29, 2023.

* cited by examiner

FREE TURBINE TURBOGENERATOR COMPRISING A REVERSIBLE ELECTRICAL MACHINE COUPLED TO THE FREE TURBINE

CROSS-REFERENCE TO RELATED APPLICATIONS

This is a National Stage Application under 35 U.S.C. § 371 of International Application No. PCT/FR2021/051875, filed Oct. 25, 2021, now published as WO 2022/090661 A1, which claims priority to French Patent Application No. 2011079, filed on Oct. 29, 2020.

TECHNICAL FIELD

The present invention relates to the general field of aeronautical turbomachines, more particularly to the switching between a gas generator and a free turbine of a free turbine turbogenerator.

PRIOR ART

A free turbine turboshaft engine for a helicopter generally comprises a gas generator and a free turbine caused to rotate by the gas flow generated by the gas generator, as well as a reversible electrical machine which can be coupled to the gas generator, in particular in order to rotate the gas generator during a start-up phase of the turboshaft engine.

Conventionally, the gas generator includes at least one compressor and a turbine coupled in rotation. The operating principle is as follows: fresh air entering into the turboshaft engine is compressed due to the rotation of the compressor before being sent to a combustion chamber where it is mixed with a fuel. The gases burned during the combustion are then evacuated at high speed.

There is then a first expansion in the turbine of the gas generator, during which the latter takes the energy necessary for driving the compressor. The turbine of the gas generator does not absorb all the kinetic energy of the burned gases and the excess kinetic energy corresponds to the gas flow generated by the gas generator. This therefore provides the kinetic energy to the free turbine so that it produces a second expansion in the free turbine which transforms this kinetic energy into mechanical energy in order to drive a receiving member, such as the rotor of the helicopter.

During the start-up phase of the turboshaft engine, it is necessary to rotate the gas generator, in other words to rotate the compressor coupled to the turbine. As mentioned in the preamble, this is precisely one of the roles of the reversible electrical machine which is most often an electric motor that is able to operate reversibly as an electrical generator.

As illustrated in FIG. 1, which schematically shows a free turbine turbomachine according to the prior art, for the start-up, in a motor operation an electrical machine 1 drives the mechanical shaft 2 of the gas generator 3, until the rotation thereof is maintained by the fuel combustion. The shaft 8 of the free turbine 9 being mechanically uncoupled from the shaft 2 of the gas generator, the electrical machine 1 does not drive the shaft 8. The free turbine 9 is then driven uniquely by the gas flow leaving the gas generator. The rotating of the compressor by the electrical machine 1 operating as a motor, indeed makes it possible to circulate the air in the compressor 4 and therefore to bring compressed air into the combustion chamber 5 in order to initiate the combustion. This combustion then produces the gas flow for rotating the turbine 6 of the gas turbine 3, after which the compressor 4 is directly rotated by the turbine 6, which signifies that the gas generator 3 is operating autonomously, reflecting the end of the start-up phase of the turboshaft engine.

In addition, for a free turbine turbogenerator as illustrated in FIG. 1, a second electrical machine 7 can be provided, engaging on the shaft 8 of the free turbine 9 in order for it to meet the need for high-power generation.

It is known that aircraft in which such turboshaft engines, in particular, are intended to be incorporated, include many electrical components which need to be supplied with electrical power. For example, for a vertical take-off and landing aircraft with electric propulsion, it is necessary to supply electrical power to all of the electric rotors which equip it.

On a turbomachine as illustrated in FIG. 1, the equipment, or accessories, such as the fuel pump and the oil pump, are mechanically connected to the shaft 2 of the gas generator 3 via an accessories box.

Once the start-up phase is terminated, it is known to use the electrical machine 1, if it is reversible, in a generator operating mode in order to produce non-propulsive electrical power (28V grid, for example) in order to supply electricity to the electrical appliances. The electrical machine 1 generates electrical power by taking mechanical power from the shaft 2 of the gas generator 3, the kinetic energy of rotation taken from the gas generator being transformed into electrical energy by said machine.

This electrical machine 1 can be non-reversible and consist of a simple starter, such as a starter motor, if there is no need for electrical generation.

FIG. 2 shows the evolution as a function of time and of the possible configuration of the turbogenerator, of the speed of the shaft 2 of the gas generator 3 as a solid line, and of the speed of the shaft 8 of the free turbine 9 as a dashed line. It can be seen that the evolution of the speed of the two shafts is independent. The point corresponding to the time of exit from the start-up phase is also indicated.

For a turboshaft engine, with a free turbine and a conventional start-up system using a reversible electrical machine, the taking of mechanical power from the shaft of the gas generator being used to generate the electrical power by the reversible electrical machine in a generator operating mode, affects the performance of the gas generator.

Indeed, the variation, during flight, of the mechanical power taken by the electrical machine 1 and the equipment from the gas generator, results in a movement of the operating line of the engine in the compressor field. This movement corresponds to a pumping margin which must be provided, which results in:

penalising the optimisation of the engine operating line, by prohibiting the use of the compressor at an optimum pressure level;

degrading, thereby, the stabilised performance, with an impact on the specific consumption.

With such a configuration, a solution for not taking mechanical power from the shaft of the gas generator in order to generate electricity consists in using an electrical machine for the start-up function with a clutch-release system, and another electrical machine integral with the free turbine shaft for the generation function as illustrated in FIG. 1, which is penalising in terms of weight and cost, as well as being rarely used in practice.

A known architecture allowing start-up of a free turbine turbogenerator without the addition of a specific starter is disclosed in document FR 2 929 324. This technical solution makes it possible to reduce the total weight and cost, and to increase the reliability of the turbogenerator compared with a turbomachine comprising two electrical machines as in FIG. 1. The technical solution described in this document consists of a switching system using two free wheels enabling start-up of the gas generator of a free turbine turboshaft engine, then generating the non-propulsive electrical power by taking mechanical energy from the free turbine shaft. The equipment remains driven via the gas generator and the accessories box.

This solution makes it possible, in particular, to improve the transient performance of the gas generator by avoiding the disadvantages of taking kinetic energy from the gas generator and, in particular, the problem of movement of the operating line of the engine in the compressor field due to the variation, during flight, of the mechanical power taken by the electrical machine.

This architecture with two free wheels is advantageous in the context of a helicopter turbomachine, in order not to drive the main rotor via the electrical machine during the start-up phase. Indeed, since the free turbine of the turbomachine is mechanically connected to the main rotor, a coupling between the shaft of the free turbine and the main rotor which could not be uncoupled during the start-up phase would require oversizing the electrical machine and the energy storage system in order to drive everything in rotation.

However, such a system remains relatively heavy, expensive and complex. It is not suitable for the case of a free turbine turbogenerator for electrically-driven rotary wing aircraft, in which the shaft of the free turbine is exclusively or essentially dedicated to the supply of electrical energy by means of the electrical machine which takes mechanical power from the shaft. In particular, this prior art system is not suitable for the case where the shaft of the free turbine is not coupled to a relatively high-inertia mechanism such as, for example, a rotor of the rotary wing of the aircraft. In other words, such a system is too heavy and complex for a free turbine turbogenerator in which the inertia of the free turbine shaft line is generally low.

DISCLOSURE OF THE INVENTION

For this purpose, the present invention proposes a free turbine turbomachine driving one or more electrical machines of sufficient power equipped with a simplified coupling system enabling weight, cost and reliability to be optimised. The useful energy produced by the turbomachine becomes uniquely electrical and therefore the free turbine is only mechanically connected to one or more electrical machines.

In an object of the invention, a turbomachine is disclosed, comprising a gas generator equipped with a first mechanical shaft, at least one reversible electrical machine and a free turbine equipped with a second mechanical shaft and caused to rotate by a gas flow generated by the gas generator.

According to a technical feature of the invention, said second mechanical shaft is directly mechanically connected to said at least one electrical machine during all the operating phases of the turbomachine, and the turbomachine further comprises a single mechanical coupling means configured to mechanically couple the first mechanical shaft to the second mechanical shaft in a first configuration, and to mechanically uncouple the first mechanical shaft from the second mechanical shaft in a second configuration. The electrical machine is sized to drive both the gas generator and the free turbine during start-up of the turbomachine.

The architecture of the turbomachine according to the invention thus makes it possible to have only a single mechanical coupling means, such as a free wheel, which makes it possible to simplify the switching system and in particular, in comparison with known solutions, to reduce the weight and the cost while increasing the reliability of the switching system.

In an application of the turbogenerator-type turbomachine, for example for an electrically-driven rotary wing aircraft, the one or more electrical machines are sized to generate high levels of electrical power (for the propulsive energy), and can easily deliver a large torque necessary for driving the gas generator and the free turbine during the start-up phase. Indeed, in such applications, the inertia of the free turbine shaft line is relatively low because it is not coupled to a relatively high inertia mechanism, such as a helicopter main rotor for example. The low inertia of this shaft line can therefore substantially correspond to the power chain with the rotors of the electrical machines. Or further, the free turbine shaft can be coupled to a relatively low inertia mechanism, such as a rotor from a multi-rotor set of a rotary wing of the aircraft, whereas the wing assembly further comprises at least one rotor that is electrically driven by at least one electrical generator of the turbogenerator.

In general, an application of the turbogenerator-type turbomachine according to the invention does not prevent the free turbine from supplying mechanical energy in parallel to electrical energy, at the time when this mechanical energy remains relatively modest in comparison to the electrical power generated.

According to a first aspect of the turbomachine, the turbomachine preferably further comprises a control unit of the electrical machine configured to place the electrical machine in motor mode during start-up of the turbomachine, and to place the electrical machine in generator mode when the gas generator becomes autonomous.

Preferably, the control unit can be configured to detect that the gas generator is autonomous when the speed of the first mechanical shaft exceeds a start-up phase output-speed threshold.

According to a second aspect of the turbomachine, the mechanical coupling means can comprise a free wheel configured so that the first mechanical shaft, when it is mechanically uncoupled from the second mechanical shaft, turns at a speed greater than the speed of rotation of the second mechanical shaft.

The free wheel can transmit the power between the two shafts in one direction only. The gas generator can in no case drive the free turbine.

According to a third aspect of the turbomachine, the turbomachine can also comprise at least one intermediate pinion having a gear ratio different from the number one, said at least one intermediate pinion being mounted between the free wheel and second mechanical shaft and/or between the free wheel and the first mechanical shaft.

This makes it possible to adjust the speed of rotation at the terminals of the free wheel and to connect two shafts which do not necessarily rotate at the same speed of rotation.

The gear ratio is determined by technological considerations or by the need to take power in order to drive accessories, for example. But also to ensure, outside of the start-up phase, that the input speed of the free wheel, in other words on the mechanical terminal of the free wheel coupled to the second mechanical shaft, is always less than the output speed of the free wheel, in other words on the mechanical terminal of the free wheel coupled to the first mechanical shaft. This is the case over the entire nominal operating range of the gas generator and of the free turbine, thus outside of the start-up phase. The goal being to ensure that the power of the free turbine cannot be transferred to the gas generator which would create a linked turbine engine.

The one or more intermediate pinions enable the gear ratio to be modified by taking into account the sign of the ratio, in other words by offering the possibility of ensuring the ability of the two shafts to counter-rotate, while ensuring the incorporation of secondary functions.

In an embodiment, the control unit can be configured to detect that the gas generator is autonomous when the torque exerted by the shaft of the free turbine on the output of the free wheel exceeds a torque threshold.

In another embodiment, the control unit can be configured to detect that the gas generator is autonomous when the input and output of the free wheel start to rotate at different speeds.

According to a third aspect of the turbomachine, the turbomachine can also comprise an accessories box to which the items of equipment are mechanically coupled.

The pinions of the accessories box thus make it possible to adapt the speeds for the accessories, such as a fuel pump or an oil pump, mechanically coupled to the first mechanical shaft, in other words to the gas generator.

According to a fourth aspect of the turbomachine, in the case where the free turbine turbomachine uses only a single electrical machine, the electrical machine can be driven directly by the mechanical shaft of the free turbine, and preferably without intermediate power pinion.

Preferably, the electrical machine can have a nominal speed of rotation equal to or close to that of the free turbine.

This configuration makes it possible to improve the efficiency of the ventilation after engine shut-down, the two shafts being simultaneously driven.

DESCRIPTION OF THE EMBODIMENTS

Figure 3:
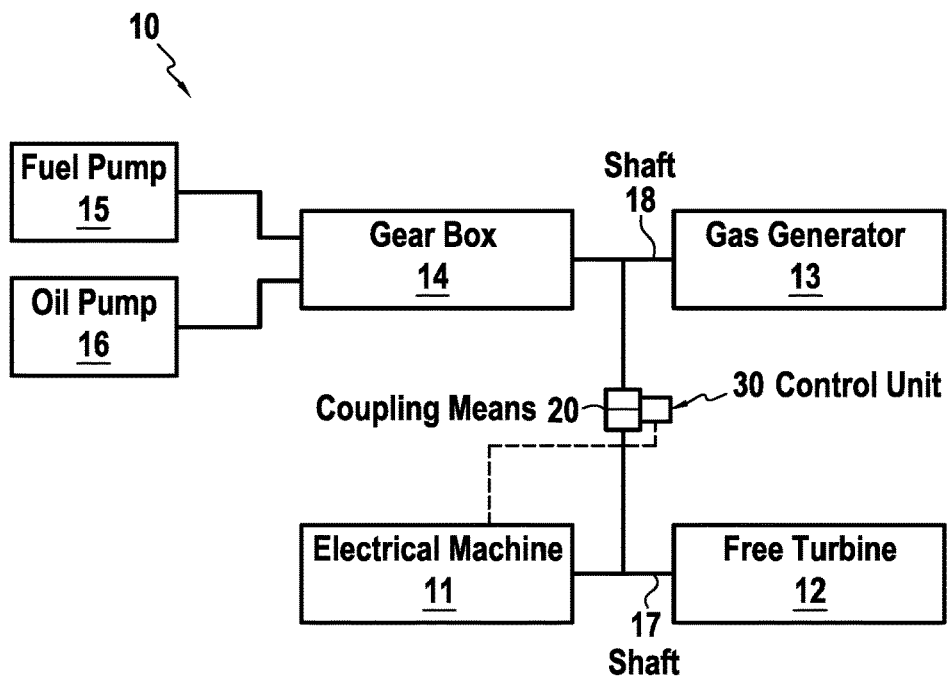
FIG. 3 is a diagram of a free turbine turbomachine according to an embodiment of the invention.

FIG. 3 schematically shows a free turbine turbomachine 10 according to an embodiment of the invention.

The turbomachine 10 comprises an electrical machine 11, a free turbine 12, a gas generator 13, an accessories box 14 and a fuel pump 15 and an oil pump 16.

The free turbine 12 comprises a shaft 17 permanently mechanically connected to the electrical machine 11, in other words during all the operating phases of the turbomachine 10, in particular the start-up phase and the electrical generation phase. This mechanical connection between the electrical machine 11 and the shaft 17 can be made directly, so that the shaft 17 and the rotor of the electrical machine 11 rotate at the same speed. It can also be made indirectly by means of a reduction gear in such a way as to obtain different speeds of rotation between the two members, in particular in the case where the nominal speeds of rotation of the two members are provided to be different.

The accessories box 14 comprises a plurality of mechanical output couplers, a first mechanical output coupler being mechanically connected and coupled to the fuel pump 15 and a second mechanical output coupler being mechanically coupled and connected to the oil pump 16. In other embodiments, other accessories can be mechanically coupled to other mechanical output couplers of the accessories box 14.

The gas generator 13 comprises a shaft 18 permanently connected and mechanically coupled to the accessories box 14.

The turbomachine 10 further comprises a single mechanical coupling means 20 configured to mechanically couple the shaft 18 of the gas generator 13 to the shaft 17 of the free turbine 12 in a first configuration, and to mechanically uncouple the two shafts 17 and 18 in a second configuration.

Figure 4:
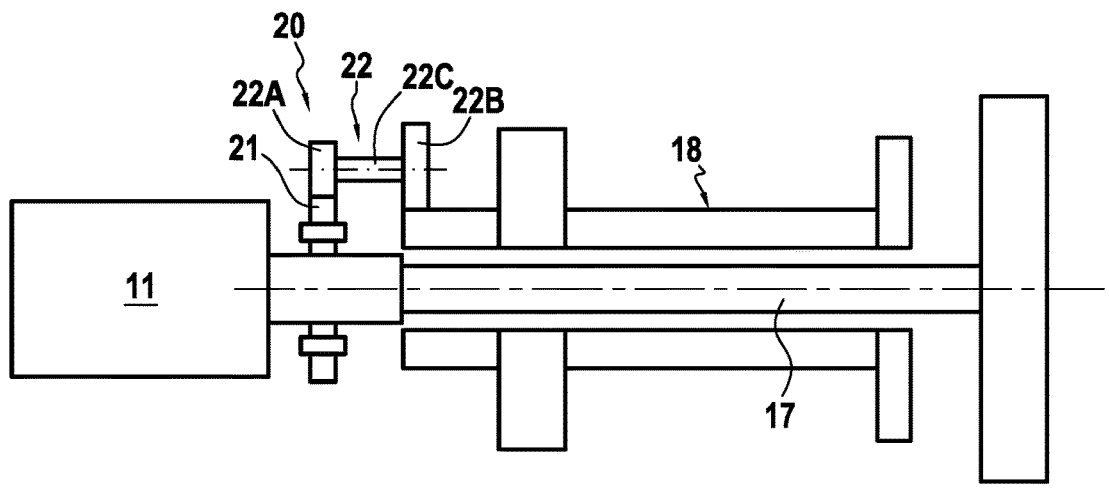
FIG. 4 is a schematic representation of the mechanical couplings between the electrical machine, the gas generator and the free turbine of the turbomachine of FIG. 3.

As illustrated in FIG. 4, a possible embodiment of the mechanical coupling means 20 comprises a free wheel 21 and an intermediate pinion 22 mounted between the free wheel 21 and the shaft 18 of the gas generator 13. The free wheel 21 corresponds to the mechanical element of the mechanical coupling means 20 making it possible to couple, or not, the shaft 17 of the free turbine 12 to the shaft 18 of the gas generator 13. The intermediate pinion 22 comprises two wheels 22A and 22B of different diameters, integrally mounted on a same pinion axis 22C, in order to have a gear ratio different from 1 and thus to have a speed of rotation of the shaft 17 of the free turbine 12 that is different from the speed of rotation of the shaft 18 of the gas generator 13.

In an alternative where the turbomachine is configured by having the shaft 17 of the free turbine 12 counter-rotating with respect to the shaft 18 of the gas generator 13, the mechanical coupling means 20 would further comprise a transmission stage (such as an additional pinion) between the free wheel 21 and the intermediate pinion 22.

As this is illustrated in FIG. 3, the turbomachine 10 further comprises a control unit 30 of the electrical machine 11 configured to place the electrical machine 11 in a motor mode during a start-up phase of the turbomachine 10, and to place the electrical machine 11 in a generator mode when the gas generator 13 becomes autonomous and therefore no longer needs to be driven by the electrical machine 11. The detection of the autonomy of the gas generator by the control unit 30 can be made by detecting the time when the speed of the shaft 18 of the gas generator 13 exceeds a so-called start-up phase output-speed threshold. Alternatively, if the mechanical coupling means 20 comprise a free wheel, this detection by the control unit 30 can be made by measuring the torque exerted by the shaft 17 of the free turbine on the output of the free wheel mechanically connected to the shaft 18 of the gas generator 13. If this torque is cancelled or becomes less than a threshold close to zero, this means that the electrical machine 11 is no longer driving the gas generator 13: it has become autonomous. As another alternative, this detection by the control unit 30 can be carried out by detecting the time when the input and the output of the free wheel start to rotate at different speeds. Indeed, when the gas generator 13 becomes autonomous, the output of the free wheel no longer turns at the same speed as the input; it starts to rotate quicker.

The coupling means 20 are mechanically configured to mechanically couple the electrical machine 11 to the free turbine 12 and to the gas generator 13 via the shafts 17 and 18 during the start-up of the turbomachine 10. Indeed, the speed of rotation at output of the free wheel 21 (image of the speed of rotation of the shaft 18) being zero or equal to the input speed of the free wheel 21 (image of the speed of rotation of the shaft 17), the latter is connected, in other words mechanically engaged, and allows the transfer of torque between the shaft 17 and the shaft 18.

In addition, the coupling means 20 are mechanically configured to disconnect the two shafts 17 and 18 when the gas generator 13 becomes autonomous and reaches the start-up phase output-speed threshold (the electrical machine is no longer activated as a motor). Indeed, the electrical machine 11 being no longer in "motor" mode, it will be driven by the free turbine 12 which will cause a speed differential at the terminals of the free wheel 21 leading to its disconnection, in other words to its mechanical disengagement. Hence, the electrical machine 11 can operate as an electric generator and produce electrical power from the rotation of the shaft 17 of the free turbine 12 driven by the rotary movement of the free turbine 12, itself driven by the gas flow delivered by the gas generator 13.

Alternatively, in a design corresponding to the diagram of FIG. 3, it is possible to have an arrangement in which the mechanical output terminal of the free wheel is coupled to the first mechanical shaft (the shaft 18 of the gas generator) by means of the accessories box 14. Hence, it is possible to directly couple this mechanical output terminal to a pinion of a gear train of the accessories box, the shaft of the gas generator being directly coupled to another pinion of the same gear train, such that the gear ratio between the output of the free wheel and the shaft of the gas generator can be different to the number one.

Figure 5:
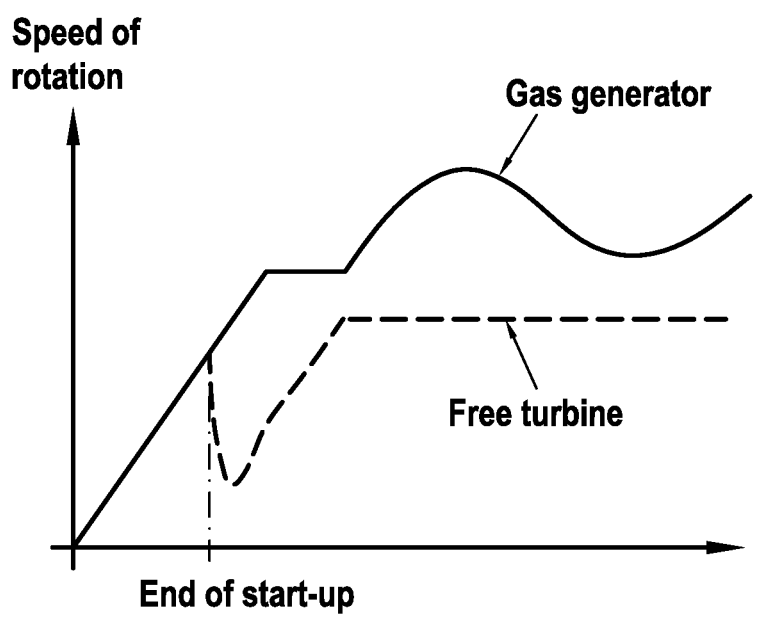
FIG. 5 is a graphical representation of the evolution, as a function of time and of the possible configuration of the turbogenerator, of the speed of the shaft of the gas generator and of the speed of the shaft of the free turbine of the turbomachine of FIG. 3.

FIG. 5 graphically shows the evolution as a function of time and of the possible configuration of the turbogenerator, of the speed of the shaft 18 of the gas generator 13 as a solid line and, as a dashed line, the speed of the shaft 17 of the free turbine 12 of the turbomachine 10 of FIG. 3.

Figure 1:
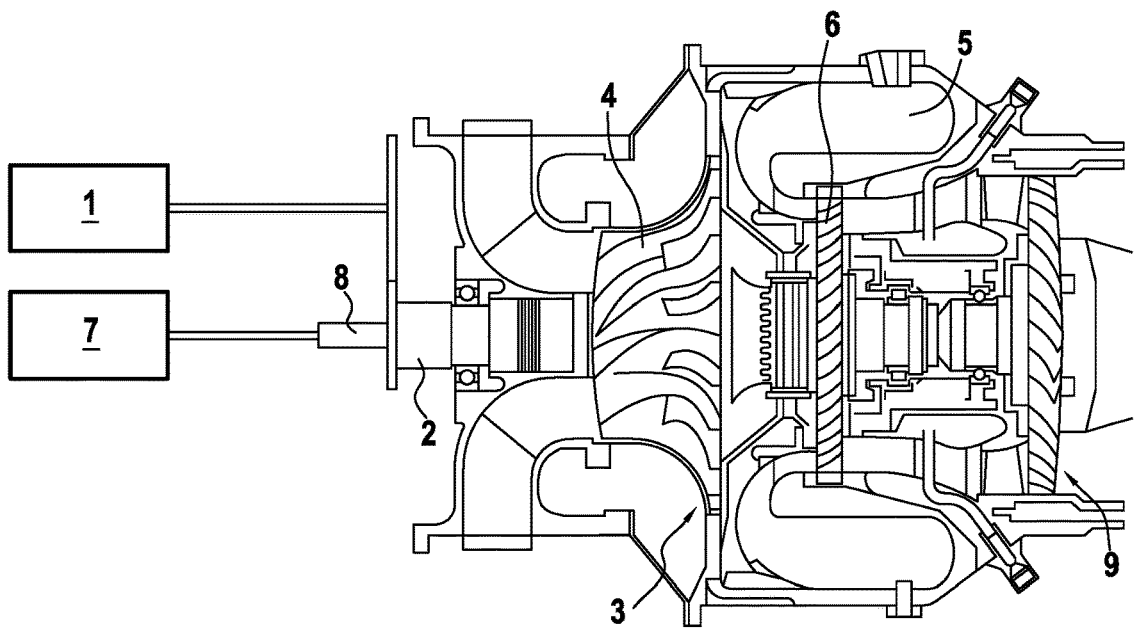
FIG. 1, already described, is a simplified schematic view of a free turbine turbomachine according to the prior art.
Figure 2:
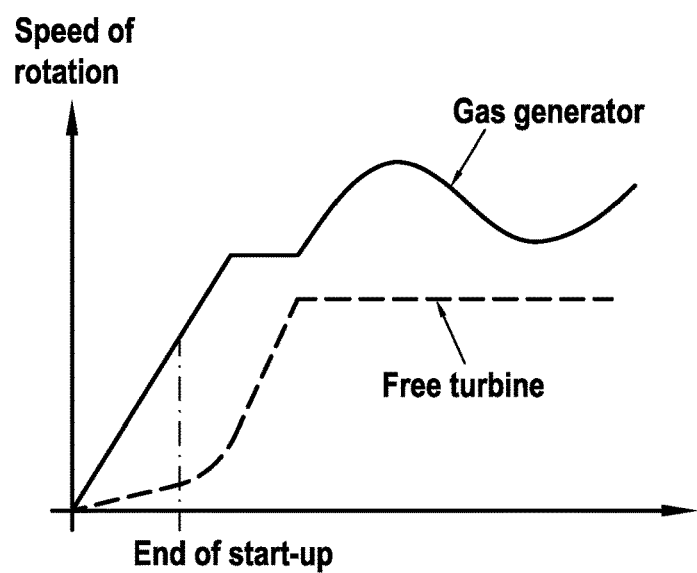
FIG. 2, already described, is a graphical representation of the evolution, as a function of time and of the possible configuration of the turbogenerator, of the speed of the shaft of the gas generator and of the speed of the shaft of the free turbine of the turbomachine of FIG. 1.

By comparing the graph of FIG. 2 and that of FIG. 5, it can be seen that the architecture of the turbomachine 10 according to the invention enables a simultaneous increase in the speed of the gas generator 13 and of the free turbine 12 until the start-up phase output threshold is reached. The speed of rotation of the electrical machine 11 after the start-up phase can temporarily reduce the time that the power available at the free turbine can be sufficient for driving the assembly (free turbine and electrical machine) at constant speed.

The free turbine turbomachine according to the present invention thus makes it possible to optimise the weight, cost and reliability of the switching system and therefore of the turbomachine.

The invention claimed is:

1. A turbomachine of a free turbine turbogenerator type, comprising a gas generator equipped with a first mechanical shaft, at least one reversible electrical machine and a free turbine provided with a second mechanical shaft and caused to rotate by a gas flow generated by the gas generator,
wherein said second mechanical shaft is mechanically connected to said at least one reversible electrical machine and the free turbine during all phases of operation of the turbomachine, and
the turbomachine further comprises a single mechanical coupling means configured to mechanically couple said first mechanical shaft to said second mechanical shaft when said at least one reversible electrical machine is operating in motor mode and mechanically uncoupling said first mechanical shaft from said second mechanical shaft when said at least one reversible electrical machine is operating in generator mode,
said at least one reversible electrical machine configured to drive the gas generator and the free turbine during start-up of the turbomachine,
wherein said single mechanical coupling means comprises a free wheel and at least one intermediate pinion mounted between the free wheel and the first mechanical shaft, and
wherein the at least one intermediate pinion includes a first wheel and a second wheel mounted between the first mechanical shaft and the free wheel,
wherein a control unit of said at least one reversible electrical machine is configured to:
measure a torque exerted by the second mechanical shaft on an output of the free wheel mechanically connected to the first mechanical shaft;
determine the measured torque is less than a torque threshold;
determine the gas generator is autonomous when the measured torque is less than the torque threshold; and
place the at least one reversible electrical machine in the generator mode upon determining the gas generator is autonomous.

2. The turbomachine according to claim 1, in which the control unit of said at least one reversible electrical machine being configured to place said at least one reversible electrical machine in said motor mode during the start-up of the turbomachine, and to place said at least one reversible electrical machine in said generator mode when the gas generator becomes autonomous.

3. The turbomachine according to claim 2, in which the control unit of said at least one reversible electrical machine is configured to detect that the gas generator is autonomous when a speed of the first mechanical shaft exceeds a start-up phase output-speed threshold.

4. The turbomachine according to claim 1, in which the free wheel is configured so that the first mechanical shaft, when it is mechanically uncoupled from the second mechanical shaft, turns at a speed greater than a speed of rotation of the second mechanical shaft.

5. The turbomachine according to claim 4, further comprising the at least one intermediate pinion having a gear ratio different from one, said at least one intermediate pinion being mounted between the free wheel and second mechanical shaft and/or between the free wheel and the first mechanical shaft.

6. The turbomachine according to claim 2, wherein the free wheel is configured so that the first mechanical shaft, when it is mechanically uncoupled from the second mechanical shaft, turns at a speed greater than a speed of rotation of the second mechanical shaft, and in which the control unit of said at least one reversible electrical machine is configured to detect that the gas generator is autonomous when the torque exerted by said second mechanical shaft of the free turbine on the output of the free wheel exceeds the torque threshold.

7. The turbomachine according to claim 2, wherein the free wheel is configured so that the first mechanical shaft, when it is mechanically uncoupled from the second mechanical shaft, turns at a speed greater than a speed of rotation of the second mechanical shaft, and in which the control unit of said at least one reversible electrical machine is configured to detect that the gas generator is autonomous when an input and the output of the free wheel starts to rotate at different speeds.

8. The turbomachine according to claim 1, further comprising an accessories box mechanically coupled to the first mechanical shaft and to which items of equipment are mechanically coupled.

9. The turbomachine according to claim 8, in which said at least one reversible electrical machine comprises a single reversible electrical machine, said single reversible electrical machine being driven directly by the second mechanical shaft of the free turbine.

10. The turbomachine according to claim 9, in which said single reversible electrical machine has a nominal speed of rotation equal to or close to that of the free turbine.

11. A turbomachine of a free turbine turbogenerator type, comprising a gas generator equipped with a first mechanical shaft, at least one reversible electrical machine and a free turbine provided with a second mechanical shaft and caused to rotate by a gas flow generated by the gas generator,
wherein said second mechanical shaft is mechanically connected to said at least one reversible electrical machine and the free turbine during all phases of operation of the turbomachine, and the turbomachine further comprises a single mechanical coupling means configured to mechanically couple said first mechanical shaft to said second mechanical shaft when said at least one reversible electrical machine is operating in motor mode and mechanically uncoupling said first mechanical shaft from said second mechanical shaft when said at least one reversible electrical machine is operating in generator mode, wherein said single mechanical coupling means comprises a free wheel configured to couple the first mechanical shaft and second mechanical shaft, wherein a control unit of said at least one reversible electrical machine is configured to:
measure a torque exerted by the second mechanical shaft on an output of the free wheel mechanically connected to the first mechanical shaft;
determine the measured torque is less than a torque threshold;
determine the gas generator is autonomous when the measured torque is less than the torque threshold; and
place the at least one reversible electrical machine in the generator mode upon determining the gas generator is autonomous.

12. The turbomachine according to claim 11, in which the control unit of said at least one reversible electrical machine being configured to place said at least one reversible electrical machine in said motor mode during the start-up of the turbomachine, and to place said at least one reversible electrical machine in said generator mode when the gas generator becomes autonomous.

13. The turbomachine according to claim 12, in which the control unit of said at least one reversible electrical machine is configured to detect that the gas generator is autonomous when a speed of the first mechanical shaft exceeds a start-up phase output-speed threshold.

14. The turbomachine according to claim 11, in which the free wheel is configured so that the first mechanical shaft, when it is mechanically uncoupled from the second mechanical shaft, turns at a speed greater than a speed of rotation of the second mechanical shaft.

15. The turbomachine according to claim 14, wherein the single mechanical coupling means comprises at least one intermediate pinion, the at least one intermediate pinion having a gear ratio different from one, said at least one intermediate pinion being mounted between the free wheel and second mechanical shaft and/or between the free wheel and the first mechanical shaft.

16. The turbomachine according to claim 12, wherein the free wheel is configured so that the first mechanical shaft, when it is mechanically uncoupled from the second mechanical shaft, turns at a speed greater than a speed of rotation of the second mechanical shaft, and in which the control unit of said at least one reversible electrical machine is configured to detect that the gas generator is autonomous when the torque exerted by said second mechanical shaft of the free turbine on the output of the free wheel exceeds the torque threshold.

17. The turbomachine according to claim 12, wherein the free wheel is configured so that the first mechanical shaft, when it is mechanically uncoupled from the second mechanical shaft, turns at a speed greater than a speed of rotation of the second mechanical shaft, and in which the control unit of said at least one reversible electrical machine is configured to detect that the gas generator is autonomous when an input and the output of the free wheel starts to rotate at different speeds.

18. The turbomachine according to claim 11, further comprising an accessories box mechanically coupled to the first mechanical shaft and to which items of equipment are mechanically coupled.

19. The turbomachine according to claim 18, in which said at least one reversible electrical machine comprises a single reversible electrical machine, said single reversible electrical machine being driven directly by the second mechanical shaft of the free turbine.

20. The turbomachine according to claim 19, in which said single reversible electrical machine has a nominal speed of rotation equal to or close to that of the free turbine.

* * * * *